(12) United States Patent
Madhavapeddi et al.

(10) Patent No.: US 9,607,000 B1
(45) Date of Patent: Mar. 28, 2017

(54) BACKUP TO TAPE-OUT USING COMMON BACKUP DATA STORAGE

(71) Applicant: EMC IP Holding Company LLC, Hopkinton, MA (US)

(72) Inventors: Vijay C. Madhavapeddi, Cupertino, CA (US); Vladimir Mandic, San Jose, CA (US); Scott H. Ogata, Lake Forest, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 122 days.

(21) Appl. No.: 13/929,755

(22) Filed: Jun. 27, 2013

(51) Int. Cl.
*G06F 17/30* (2006.01)
*G06F 11/14* (2006.01)

(52) U.S. Cl.
CPC .... *G06F 17/30174* (2013.01); *G06F 11/1466* (2013.01); *G06F 11/1469* (2013.01)

(58) Field of Classification Search
CPC ............. G06F 11/1456; G06F 11/1469; G06F 11/1466; G06F 17/3017
See application file for complete search history.

(56) References Cited

U.S. PATENT DOCUMENTS

| | | | | |
|---|---|---|---|---|
| 5,613,097 | A * | 3/1997 | Bates ................ | G06F 17/30067 |
| 5,819,296 | A * | 10/1998 | Anderson ........... | G06F 17/2205 |
| 7,472,242 | B1 * | 12/2008 | Deshmukh et al. .......... | 711/162 |
| 7,523,253 | B2 * | 4/2009 | Mizuno ......................... | 711/111 |
| 8,275,750 | B2 * | 9/2012 | Bhandiwad et al. .......... | 707/661 |
| 2004/0044705 | A1 * | 3/2004 | Stager ............... | G06F 17/30067 |
| 2005/0193235 | A1 * | 9/2005 | Sandorfi ............. | G06F 11/1456 714/6.12 |
| 2006/0218434 | A1 * | 9/2006 | Solhjell ............... | G06F 11/1456 714/6.12 |
| 2014/0082280 | A1 * | 3/2014 | Shioya et al. ................ | 711/114 |

OTHER PUBLICATIONS

Little, David B., Skip Farmer, and Oussama El-Hilali. Digital Data Integrity: The Evolution from Passive Protection to Active Management. Chichester: John Wiley, 2007. Web. Mar. 26, 2015.*

* cited by examiner

*Primary Examiner* — Robert Beausoliel, Jr.
*Assistant Examiner* — Arthur Ganger
(74) *Attorney, Agent, or Firm* — Van Pelt, Yi & James LLP

(57) ABSTRACT

A method of backing up data including backing up, using a processor, a backup data set to a first backup data storage; storing the backup data set in a native file format in a first storage area of the first backup data storage; generating a data stream file of the backup data set in a data stream file format, the data stream file being a logical copy of the backup data set and containing metadata of the backup data set; storing the data stream file in a second storage area of the first backup data storage; and replicating, using the data stream file, the backup data set onto a second backup data storage.

14 Claims, 3 Drawing Sheets

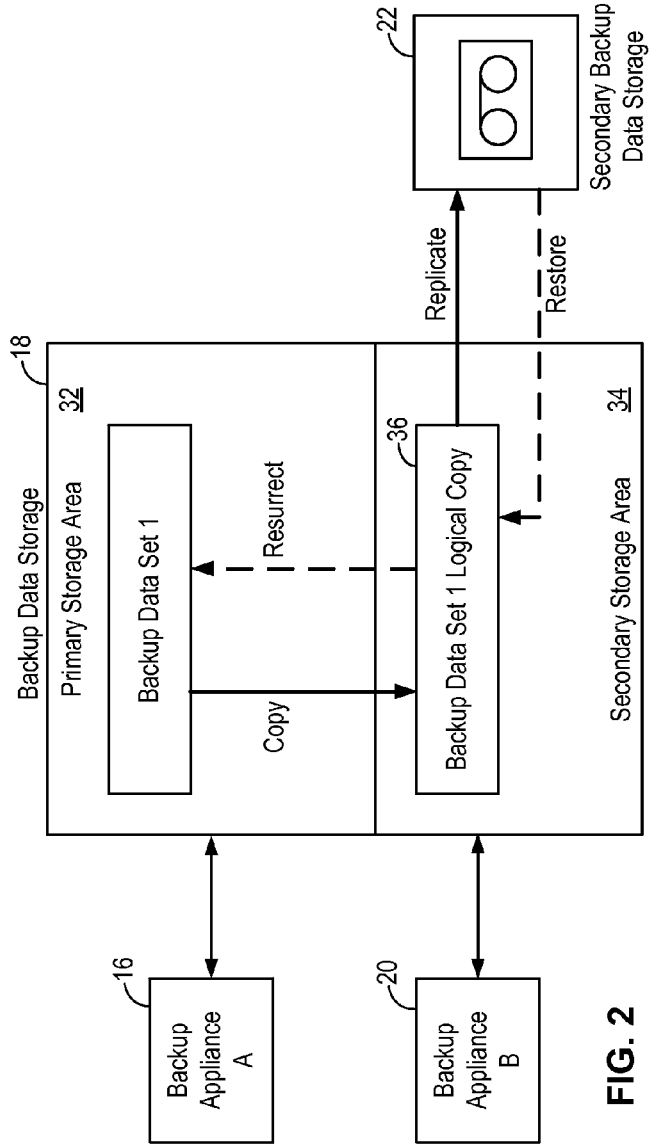
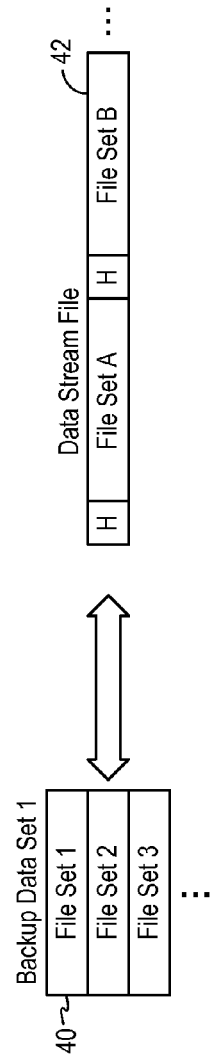
FIG. 2
FIG. 3

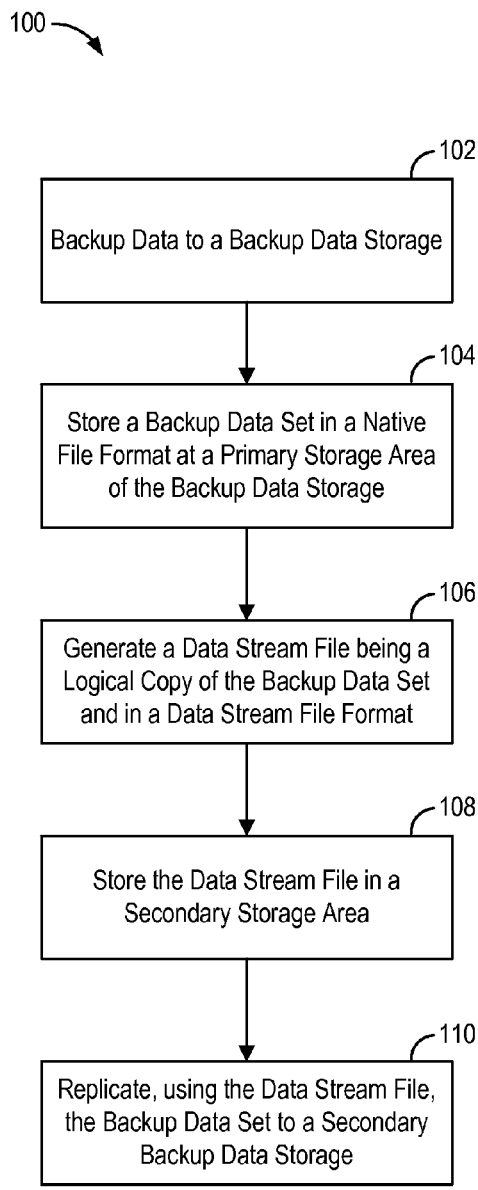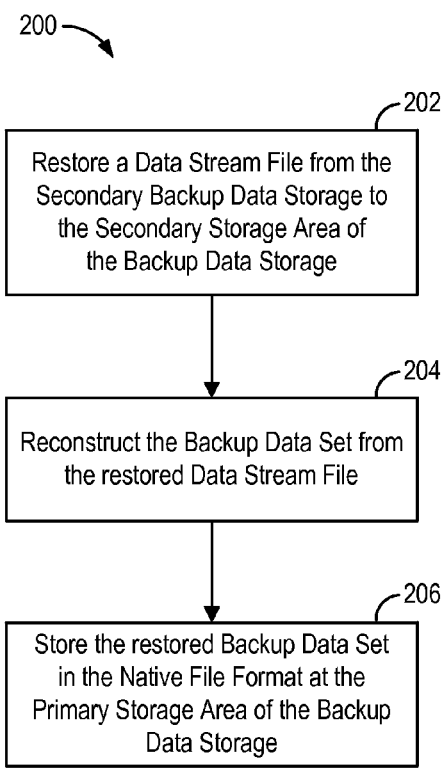
Fig. 4
Fig. 5

US 9,607,000 B1

BACKUP TO TAPE-OUT USING COMMON BACKUP DATA STORAGE

BACKGROUND OF THE INVENTION

The contents and data of computer systems or information systems can be lost after a data loss event. Therefore, backup is important for ensuring recovery of the data of the computer systems or information systems in the case of corruption, data loss, or disaster. It is desirable for computer files and data stored on a file server or a workstation to be backed up periodically by a backup and recovery system, so that the computer files and data may be restored after a data loss event. Recently, enterprises and organizations are experiencing a massive growth in data use. The rapid growth is fueled by the increasing volume and detail of information captured by the enterprises, and by the rise of usage of multimedia, social media, the Internet, and the like. As a result, the volume of data required to be backed up is increasing at a rapid pace as well. Furthermore, some enterprises and organizations desire to have a separate copy of the backup data to increase the safety of the data. Backing up multiple copies of the data is often accomplished through the use of a primary backup system and a replica backup system.

BRIEF DESCRIPTION OF THE DRAWINGS

Various embodiments of the invention are disclosed in the following detailed description and the accompanying drawings.

FIG. 2 is a block diagram illustrating the data backup method operating on a common backup data storage in embodiments of the present invention.

FIG. 3 illustrates the file formats of the backup data stored in the common backup data storage.

FIG. 4 is a flow chart illustrating the data backup method in embodiments of the present invention.

FIG. 5 is a flow chart illustrating the data recovery method in embodiments of the present invention.

DETAILED DESCRIPTION

Figure 1:
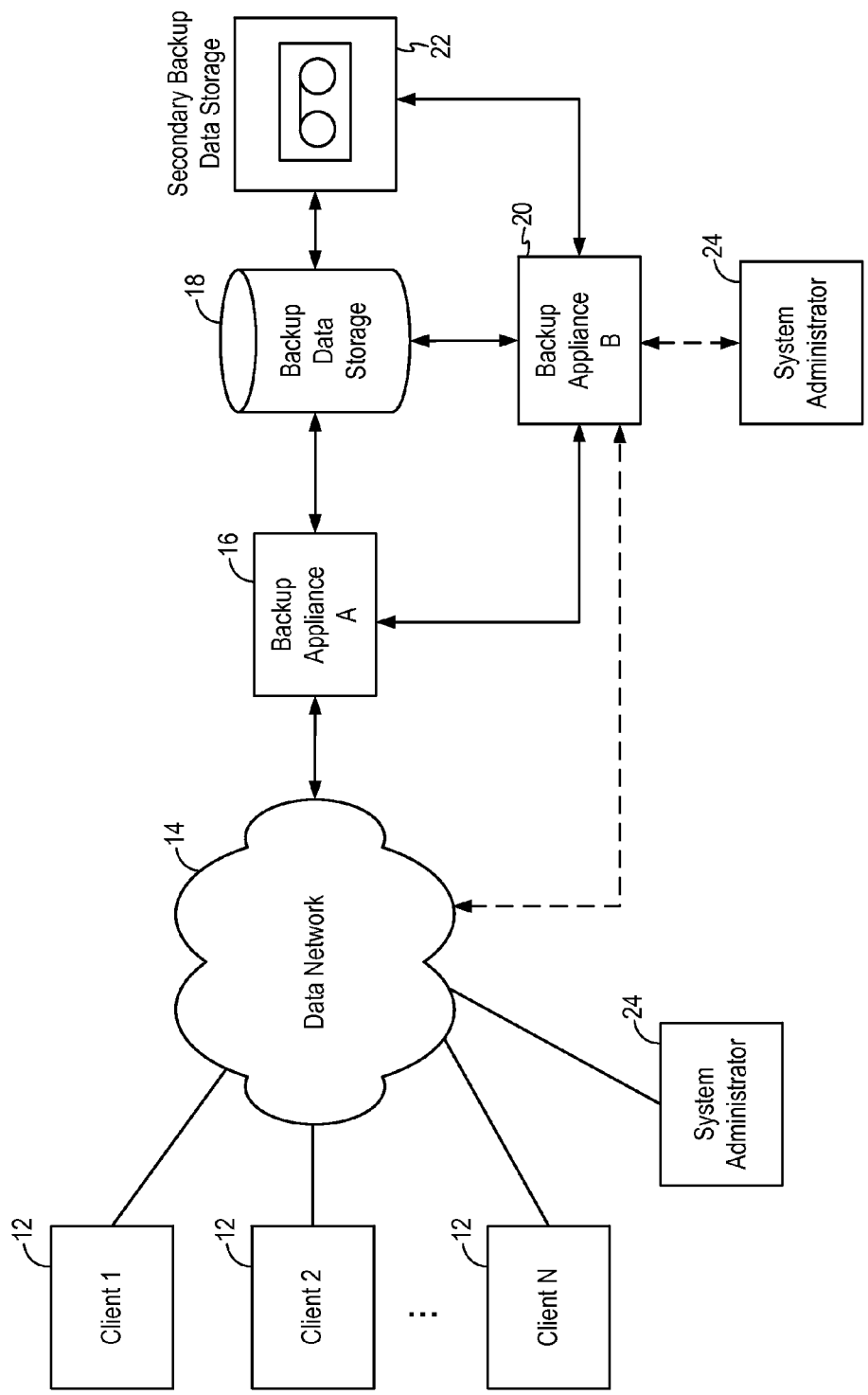
FIG. 1 is a block diagram in which a group of client devices can be backed up by a backup and recovery system in embodiments of the present invention.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a data backup method uses a common backup data storage to store a back up data set and a data stream file of the same backup data set where the data stream file is generated as a logical copy of the backup data set. The data backup method can then create a replica of the backup data set using the data stream file. For example, the data stream file can be written out to a removable storage medium, such as a magnetic tape. Accordingly, the same common backup data storage can be used to generate a second copy of the backup data set to enable a separate copy of the backup data to be created for enhanced safety.

FIG. 1 is a block diagram in which a group of client devices can be backed up by a backup and recovery system in embodiments of the present invention. Referring to FIG. 1, client devices 12 (e.g., client 1) may be connected to other devices, servers, or other elements via a data network 14. Data network 14 may include a dedicated communication link, one or more networks, a local area network, a wide area network, a storage area network, the Internet, a wired network, a wireless network, and the like. Client devices 12 may include desktop computers, laptop computers, workstations, mainframe computers, or any other devices that include storage media for storing data, including hard disk drives, floppy disks, optical discs, flash memory, and the like. File systems may be used on client devices 12 to organize data in an efficient manner and to maintain the physical locations of the computer files that are stored on the client devices.

The contents and data stored in client devices 12 can be lost after a data loss event. For example, the contents and data of the client devices 12 may be accidently deleted by end-users, intentionally corrupted by malicious efforts of outsiders, or destroyed by a disaster, such as a fire or earthquake. Therefore, the contents and data of the client devices 12 should be backed up periodically, such that they may be restored after a data loss event.

In embodiments of the present invention, the backup and recovery system is connected to client devices 12 via data network 14. A system administrator or a user may use the backup and recovery system to periodically backup the contents and data of a particular client device 12 into a backup data storage 18. In the present embodiment, backup data storage 18 is a hard disk storage or solid state storages, and the like. In some embodiments, during a backup, an entire file system mounted on a client device 12 is backed up by a process running on the client device 12. For example, the process may read all the directories and files on the file system, process the data contained in the directories and files, and then save the backup data into backup data storage 18. In the present illustration, the client devices 12 communicate with the primary backup data storage 18 directly through the data network 14. In other embodiments, the client devices 12 may communicate with the backup data storage 18 through a storage node interface.

In the present embodiment, the backup and recovery system includes a backup appliance 16 (backup appliance A) configured to back up the contents of one or more client devices 12 onto the backup data storage 18. The backup and recovery system further includes a backup appliance 20 (backup appliance B) in communication with the backup appliance A and the backup data storage 18 to generate a data stream file to enable additional copies of the backup data to be created, as will be explained in more detail below. In the present example, the backup appliance B is configured to generate a second copy of the backup data on a secondary backup data storage 22. The secondary backup data storage 22 may be hard disk drives, solid state storages, magnetic tapes, optical disks, virtual tape libraries (VTL), or other backup media. In particular, in some embodiments, the secondary backup data storage 22 is a removable storage medium, such as a magnetic tape, to allow a second copy of the backup data to be made and stored at a physical location away from the client devices 12 or the backup data storage 18.

In the present embodiment, the backup and recovery system is configured using two backup appliances 16 and 20. Backup appliance A is a software module executing on a processor and backup appliance B is a software module executing on the same processor or a different processor. In operation, a user, such as a system administrator, accesses backup appliance B to perform backup of client devices 12. The system administrator 24 may communicate with backup appliance B through the data network 14 or through other communication link or network connections. Backup appliance B communicates with backup appliance A to facilitate the backup of data to the backup data storage 18. Backup appliance A is thus transparent to the system administrator 24 in operation. In other embodiments, backup appliance A and backup appliance B can be configured as a single software module. Thus, the backup and recovery system of the present invention may use a single backup appliance to backup data from client devices and to generate the data stream file for replication to a secondary backup data storage. The use of two backup appliances A and B is illustrative only.

In embodiments of the present invention, backup appliance A is implemented as a deduplication backup software module. In one embodiment, backup appliance A is implemented using an EMC® Avamar® software module to facilitate deduplicated backup of data from client devices 12 to the backup data storage 18. In some embodiments, backup appliance B is implemented using EMC® NetWorker® software module. Furthermore, in some embodiments, the backup data storage 18 is implemented using an EMC® Data Domain® deduplication disk storage system.

FIG. 2 is a block diagram illustrating the data backup method operating on a common backup data storage in embodiments of the present invention. FIG. 3 illustrates the file formats of the backup data stored in the common backup data storage. Referring to FIGS. 2 and 3, the backup data storage 18 is partitioned into two storage partitions or areas: a primary storage partition or area 32 and a secondary storage partition or area 34. In the present description, a storage partition or storage area refers to a logical division or a logical storage unit in a data storage, typically a hard disk storage or solid state storage. The primary storage area 32 and the secondary storage area 34 do not necessarily have the same storage capacity. In particular, the secondary storage area 34 only needs to have a fraction of the storage capacity of the primary storage area 32 for storing logical copy of the backup data in the primary storage area, as will be explained in more detail below.

Backup appliance A, in response to control from backup appliance B, initiates backup of data from client devices 12 (FIG. 1) onto backup data storage 18. Backup data for client devices 12 may be divided into groups referred to as "backup data sets." A backup data set typically includes multiple clients with each having multiple save sets and where a save set is a unit of backup data and is typically composed of one or more files and/or one or more file systems for a single client device. The backup data for a group of the client devices form a backup data set on which backup is performed based on a given schedule.

In embodiments of the present invention, backup appliance A stores backup data in the form of backup data sets in the primary storage area 32 of the backup data storage 18. The backup data sets are stored in a native file format 40 (FIG. 3) with the backup data organized in the same manner as the client devices. For example, the backup data sets may be stored using the same directory and file systems as the client devices.

Backup appliance B is configured to generate a data stream file being a logical copy of a backup data set in the primary storage area 32 and stores the data stream file in the secondary storage area 34. For example, for a backup data set 1, backup appliance B generates a data stream file 36 being a logical copy of the backup data set 1. The data stream file 36 is stored in the secondary storage area 34. The data stream file 36 contains all of the metadata of the backup data set 1 and is encoded in a data stream file format 42. In one embodiment, the data stream file format 42 includes a header portion containing metadata and a payload portion containing data files of the backup data set. A data stream file may include multiple header and payload portions encoding multiple sets of files in the backup data set. The backup appliance B is configured to stitch files in the backup data set together into a single data stream file 36 including header portions and associated payload portions. As thus configured, the data stream file is stored with metadata information relating to the data being backed up to enable seamless and quick recovery of the backup data. In particular, the data stream file is stored with the knowledge of the file structure and organization of the backup data contained therein. With the metadata information associated with the backup data available, the backup data can be quickly and easily restored when needed.

Because the data stream file 36 is only a logical copy of the backup data set, the payload portion of the data stream file 36 contains only logical references to the data files of the backup data set 1. The content of the backup data set 1 is not duplicated. Therefore, the secondary storage area 34 does not need to duplicate the storage capacity of the primary storage area 32. In fact, the secondary storage area 34 only needs a fraction of the storage capacity of the primary storage area 32 to store the logical copies of the backup data sets in the primary storage area.

With one or more data stream files thus generated for one or more corresponding backup data sets in backup data storage 18, backup appliance B may use the data stream files to generate additional copies of the backup data sets onto a secondary backup data storage 22. Additional copies of the backup data can be created to enhance the safety of the data. In some embodiments, backup appliance B uses the data stream file 36 with the logical references to replicate the backup data set onto the secondary backup data storage 22. In one embodiment, the secondary backup data storage 22 is a tape drive and the data stream file 36, being in a data stream file format, facilitate easy tape out of the backup data to the tape drive. In embodiments of the present invention, the secondary backup data storage may be part of the backup data storage system 18 or may be a data storage system external to the backup data storage.

In the event that the backup data needs to be restored, backup appliance B retrieves and restores the data stream file stored on the secondary backup data storage 22 to the secondary storage area 34 of the backup data storage 18. Backup appliance B, or backup appliance A under the direction of backup appliance B, then resurrects the backup data in the data stream file from the data stream file format to the native file format. In particular, the backup appliance A or B reconstructs the files and directories of the backup data set from the data stream file. The restored backup data set is stored in the primary storage area of the backup data storage 18. The data backup method of the present invention thus enables fast and seamless recovery of backup data from the second copy as the second copy is stored with all the metadata information of the backup data set.

FIG. 4 is a flow chart illustrating the data backup method in embodiments of the present invention. Referring to FIG. 4, a data backup method 100 starts by backing up data of one or more computing systems onto a backup data storage (102). The backup data is stored as a backup data set in a native file format at a primary storage area of the backup data storage (104). The method 100 then generates a data stream file of the backup data set (106). The data stream file is a logical copy of the backup data set and contains metadata of the backup data set. Furthermore, the data stream file is in a data stream file format. The method 100 stores the data stream file in a secondary storage area of the backup data storage (108). Then, the method 100 then uses the data stream file to replicate the backup data set onto a second backup data storage (110).

FIG. 5 is a flow chart illustrating the data recovery method in embodiments of the present invention. Referring to FIG. 5, a data recovery method 200 starts by restoring a data stream from the secondary backup data storage to the secondary storage area of the backup data storage (202). The method 200 then reconstructs the backup data set from the restored data stream file (204). In particular, the method 200 converts the backup data from the data stream file format to the native file format. For example, the method 200 reconstructs the files and directories of the backup data set from the data stream file. The restored backup data set in the native file format is stored in the primary storage area of the backup data storage (206).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of backing up data, comprising:
   backing up, using a processor, a backup data set to a first backup data storage, the backup data set containing multiple save sets of backup data for a plurality of client devices, each save set of backup data being associated with a single client device and containing files or file systems of the client device;
   storing the backup data set in a native file format in a first storage area of the first backup data storage as a first backup copy;
   generating a data stream file from the backup data set stored in the first storage area where the backup data set is in the native file format and the data stream file is in a data stream file format, the data stream file being a logical copy of the backup data set containing only logical references to data files of the backup data set, without duplicating the content of the backup data set and including a plurality of header portions containing metadata and a plurality of associated payload portions containing logical references to data files of the backup data set, the payload portions stitching data files from one or more save sets of backup data, the metadata stored in each header containing information of a file structure and an organization of the files and file systems in the save sets of backup data being stored in each associated payload portion;
   storing the data stream file in a second storage area of the first backup data storage, the data stream file containing logical references to all of the files in the backup data set in the first storage area; and
   replicating, using the data stream file, the backup data set onto a second backup data storage as a second backup copy.

2. The method of claim 1, further comprising:
   restoring the data stream file from the second backup data storage to the second storage area of the first backup data storage;
   converting the restored data stream file in the data stream file format to a restored backup data set having the native file format, the converting including reconstructing files and directories of the restored backup data set using the metadata in the data stream file; and
   storing the restored backup data set in the native file format in the first storage area of the first backup data storage.

3. The method of claim 1, wherein backing up, using a processor, a backup data set to a first backup data storage comprises:
   backing up with dedepulication the backup data set to the first backup data storage.

4. The method of claim 1, wherein replicating, using the data stream file, the backup data set onto a second backup data storage comprises:
   replicating, using the data stream file, the backup data set onto a tape storage.

5. The method of claim 1, wherein replicating, using the data stream file, the backup data set onto a second backup data storage comprises:
   replicating, using the data stream file, the backup data set onto the second backup data storage being a storage system external to the first backup data storage.

6. The method of claim 1, wherein generating a data stream file of the backup data set in a data stream file format comprises:
   generating the data stream file comprising header portions containing metadata information of data in the backup data set and data payload portions containing backup data files.

7. The method of claim 1, wherein the first and second storage areas comprise logical storage units of the first backup data storage.

8. A system for backing up data, comprising:
   a processor configured to:
   back up, using a processor, a backup data set to a first backup data storage, the backup data set containing multiple save sets of backup data for a plurality of client devices, each save set of backup data being associated with a single client device and containing files or file systems of the client device;

store the backup data set in a native file format in a first storage area of the first backup data storage as a first backup copy;

generate a data stream file of the backup data set stored in the first storage area and in the native file format, the data stream file being in a data stream file format, the data stream file being a logical copy of the backup data set containing only logical references to data files of the backup data set, without duplicating the content of the backup data set and including a plurality of header portions containing metadata and a plurality of associated payload portions containing logical references to data files of the backup data set, the payload portions stitching data files from one or more save sets of backup data, the metadata stored in each header containing information of a file structure and an organization of the files and file systems in the save sets of backup data being stored in each associated payload portion;

store the data stream file in a second storage area of the first backup data storage, the data stream file containing logical references to all of the files in the backup data set in the first storage area; and replicate, using the data stream file, the backup data set onto a second backup data storage as a second backup copy; and a memory coupled to the processor and configured to provide the processor with instructions.

9. The system recited in claim 8, wherein the processor is further configured to:

restore the data stream file from the second backup data storage to the second storage area of the first backup data storage;

convert the restored data stream file in the data stream file format to a restored backup data set having the native file format, the converting including reconstructing files and directories of the restored backup data set using the metadata in the data stream file; and store the restored backup data set in the native file format in the first storage area of the first backup data storage.

10. The system recited in claim 8, wherein the processor is further configured to back up with dedepulication the backup data set to the first backup data storage.

11. The system recited in claim 8, wherein the processor is further configured to replicate, using the data stream file, the backup data set onto a tape storage.

12. The system recited in claim 8, wherein the processor is further configured to replicate, using the data stream file, the backup data set onto the second backup data storage being a storage system external to the first backup data storage.

13. The system recited in claim 8, wherein the processor is further configured to generate the data stream file comprising header portions containing metadata information of data in the backup data set and data payload portions containing backup data files.

14. The system recited in claim 8, wherein the first and second storage areas comprise logical storage units of the first backup data storage.

* * * * *